United States Patent [19]

Kotoye et al.

[11] Patent Number: 4,717,582
[45] Date of Patent: Jan. 5, 1988

[54] METHOD AND APPARATUS FOR CONTROLLING THE DENSITY OF A FOAM

[75] Inventors: Femi O. Kotoye; John M. Kernstock, both of Midland, Mich.

[73] Assignee: The Dow Chemical Company, Midland, Mich.

[21] Appl. No.: 866,175

[22] Filed: May 22, 1986

[51] Int. Cl.$^4$ .......................... B05D 5/00; B05C 11/10
[52] U.S. Cl. ........................................ 427/8; 73/32 R; 118/688; 137/5; 137/88
[58] Field of Search ............................ 427/8; 118/688; 73/32 R; 324/439, 442, 450; 137/4, 5, 88

[56] References Cited

U.S. PATENT DOCUMENTS 4,620,983  11/1986  Zimmer ................................. 427/8

Primary Examiner—Evan K. Lawrence
Attorney, Agent, or Firm—T. J. Mielke; B. M. Kanuch

[57] ABSTRACT

A method and apparatus for controlling the density of a foam. The method involves measuring the electrical conductivity of a foam wherein the electrical conductivity of the foam varies with the density thereof and adjusting the density of the foam in response to the measured electrical conductivity to prepare a foam having a desired density. The apparatus comprises means for generating and applying a foam, said means being connected by an enclosed pathway. Located within the enclosed pathway is an electrical conductivity sensor. The conductivity sensor is electronically connected to a translation means. The conductivity sensor provides an electrical signal, related to conductivity of the foam, to the translation means. The translation means is connected to a gas flow controlling means. Based on the signal received from the conductivity sensor, the translation means provides a signal to gas flow control means which influences gas flow control means to increase or decrease the density of the foam thereby to produce a foam having the desired density.

22 Claims, 1 Drawing Figure

METHOD AND APPARATUS FOR CONTROLLING THE DENSITY OF A FOAM

BACKGROUND OF THE INVENTION

This invention relates to a method and apparatus for controlling the density of a foam. Specifically, the invention relates to a method and apparatus for controlling the density of a foam on a carpet structure. In the production of carpets, such as carpets of the tufted type wherein a plurality of loops of yarn are deposited in a primary backing material, the back surface of said carpet structure is generally coated with a foam. The foam coating serves to anchor the loops of yarn in the primary backing material. The foam generally comprises a natural or synthetic latex composition or like material. Exemplary of synthetic latexes employed to bind the loops of yarn in the primary backing material are styrene/butadiene copolymer latexes.

After application of the foam coating a second woven or nonwoven backing material is generally applied to the carpet structure. Exemplary of such secondary backing materials is a woven mat of jute.

The amount of foam applied to the back of the carpet structure is most desirably the minimum amount of foam suitable for achieving a desirable degree of adhesion between the loops of yarn and the primary backing material as well as a desirable degree of adhesion between the primary backing material and the secondary backing material.

It has been found desirable to apply the material which binds the loops of yarn in the primary backing maaterial (binding material) as a foam on the back surface of the carpet structure. The binder material is applied as a foam for several reasons. First, it has been found that application of the binder material as a foam tends to inhibit penetration of the binder material onto the carpet facing. Second, the application of binder material in the form of a foam has been found to produce carpet structures having a more uniform distribution of the binder material as well as producing carpet structures with the minimum amount of binder material necessary to achieve the desired properties.

It is desirable that the density (amount of gas incorporated into the foam) of the foam be maintained at a relatively constant level. This is desirable in order to achieve the desired physical properties through application of a minimum amount of foam. Since a relatively constant thickness of foam is applied to the carpet structures, variations in the density of the foam results in a surplus of binder material being applied to the carpet structure when the density of the foam is too great and a dearth of binder material being applied to the carpet structure when the density of the foam is below a desirable level.

In the past, the density of the foam has been controlled by visual inspection of the foam as it is applied to the carpet structure. This method of control has been found to be less than desirable. The lack of the ability to carefully control the density of the foam has necessitated the application of more than the minimum amount of foam (binder material) necessary to achieve the desirable physical properties. It is desirable to find an accurate method of controlling the density of the foam within a narrow range thus enabling the application of the minimum amount of foam necessary to achieve the desirable physical properties. It is to this goal and other related goals that the present invention is directed.

In a broader sense, the invention relates to a method and apparatus for controlling the density of a foam. Foams are employed in many uses in the fabrication and food industries. In many instances wherein foams are used, it is desirable to control the density of the foam. It is to the goal of accurately controlling the density of foams that the present invention is also directed.

SUMMARY OF THE INVENTION

The present invention concerns a method for controlling the density to a predetermined level of a foam during the preparation thereof, wherein the electrical conductivity of the foam varies with the density thereof, the steps of the method comprising:

(a) measuring the electrical conductivity of the foam during its preparation; and (b) adjusting the density of the foam in response to the measured electrical conductivity to produce an electrical conductivity corresponding to the desired density, thereby providing a foam with a desired predetermined density.

Additionally, the present invention concerns an apparatus for controlling the density of a foam wherein the electrical conductivity of the foam varies with the density thereof, the apparatus comprising:

(a) means for generating a foam;

(b) an application outlet;

(c) an enclosed pathway connecting the means for generating a foam and the application outlet, said enclosed pathway being suitable for conveying the foam from the means for generating a foam to the application outlet;

(d) an electrical conductivity sensor located in the enclosed pathway, said electrical conductivity sensor being capable of measuring the electrical conductivity of the foam in the enclosed pathway; and (e) means for altering the density of the foam to produce foam having a desired density in response to the conductivity measurement.

BRIEF DESCRIPTION OF THE DRAWINGS

The understanding of this invention will be facilitated by referring to the accompanying drawing in which.

DETAILED DESCRIPTION OF THE INVENTION

Figure 1:
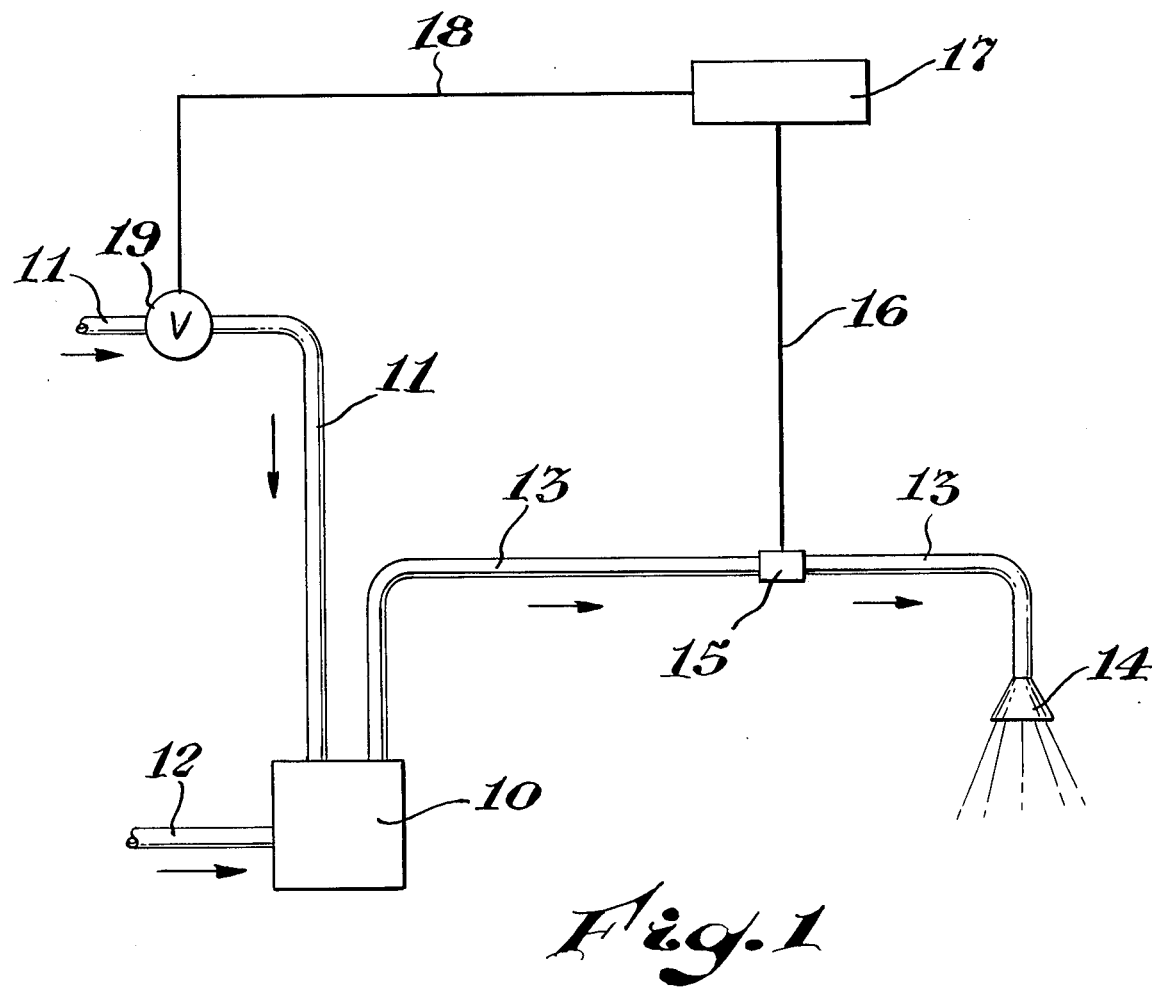
FIG. 1 is a schematic representation which illustrates one embodiment of this invention.

Referring to the drawings in more detail, FIG. 1, which represents a preferred embodiment of the present invention, depicts a means 10 for generating a foam material. Means 10 for generating a foam material, has an inlet pipe 12, for composition feed, and an inlet pipe 11, for gas from which to form the foam. Means 10 has an outlet pipe 13 through which the foam flows to reach application outlet 14. Located along outlet pipe 13 is a conductivity sensor 15 which conductivity sensor is capable of measuring the conductivity of the foam as it passes through outlet pipe 13. Conductivity sensor 15 is connected by lead 16 to translation means 17. Translation means 17 is capable of translating a signal from conductivity sensor 15, which signal relates to the conductivity of the foam coating. The signal passes from conductivity sensor 15 through lead 16 to translation means 17. Translation means 17 translates the signal from conductivity sensor 15 into a signal capable of passing through lead 18 to controlling means 19. Based on the signal received from translation means 17 controlling means 19 is capable of regulating the amount of gas flowing through gas inlet pipe 11 into means 10, for generating a foam which has a density which is related to the electrical conductivity thereof.

Means 10, for generating a foam are well-known in the art. Such means suitably comprise mechanical means for incorporating a desirable amount of gas into a material to be foamed. In the practice of the present invention, means 10 for generating a foam will generally form the foam by mechanically incorporating an amount of gas into a material to be foamed.

In one preferred embodiment of the present invention, the material to be foamed is suitable for binding loops of yarn (hereinafter tufts) to a primary backing material. Exemplary of compositions suitable for binding the tufts to the primary backing material are natural and synthetic latexes. Generally, the natural or synthetic latexes have incorporated therein additives such as fillers, surfactants, thickeners, etc. The latexes (with additives) have a solids content of at least about 40 weight percent, preferably from about 45 to about 90 weight percent, based on total weight of latex and additives. Latexes with a solids content below about 40 weight percent produce foams which are unstable and possess insufficient binding power when applied at normal levels. Latexes with a solids content above about 90 weight percent are difficult to foam. Exemplary of synthetic latexes suitable for use in binding tufts to the primary backing is a latex of a polymer of: styrene and butadiene; ethylene and vinylacetate; ethylene and vinyl chloride; vinyl chloride, styrene, and butadiene; styrene, butadiene and an acrylate monomer having from 1-6 carbon atoms; polybutadiene; and vinylidene chloride. Desirably, the latex comprises a copolymer of styrene and butadiene. Preferably the latex comprises a copolymer of from about 40 to about 75 weight percent styrene and from about 25 to about 60 weight percent butadiene.

The material to be foamed flows into means 10 for generating a foam through composition inlet pipe 12.

The gas which means 10 incorporates into the foamable composition enters means 10 through gas inlet pipe 11. Any gas capable of incorporation into the material to be foamed is suitable for use in the practice of the present invention. For reasons of economic operation and safety, it is generally preferred that the gas incorporated into the material to be foamed comprise the mixture of gases present in the ambient atmosphere (air).

Generally, the amount of gas incorporated into the material to be foamed is within the range of from about 35 to about 95 percent by volume. The percent of gas incorporated into the material to be foamed is calculated according to the formula:

$$\text{percent gas} = 100 - \left[ \frac{D_F}{D_{NF}} \times 100 \right]$$

wherein $D_F$ is the density of the foamed material and $D_{NF}$ is the density of the material to be foamed prior to foaming.

For the purposes of the present invention, all references pertaining to the density of the foam or changing the density of the foam refers to changes in the density of the foam caused by the incorporation of a greater or lesser amount of gas into said foam. Therefore, when we speak of the desirability of controlling the density of the foam we are in effect referring to the desirability of producing a foam having incorporated therein a consistent, uniform amount of gas. When we talk of changing the density of the foam, we refer to lowering the density by incorporating more gas into the foam or raising the density by incorporating less gas into the foam.

The foam exits means 10 through an enclosed pathway such as outlet pipe 13. The enclosed pathway leads to application outlet 14. Any enclosed pathway capable of conveying the foam from means 10 to application outlet 14 is suitable for use in the present invention. As depicted in FIG. 1, the enclosed pathway is suitably a general circular pipe. Any application outlet capable of directly or indirectly applying foam to its intended use is suitable for use in the present invention. Those skilled in the art are appraised of application outlets suitable for use in the practice of the present invention. In one preferred embodiment wherein the foam is suitable for binding loops of yarn to a primary backing material application outlets suitable for use include a spray nozzle capable of applying the foam directly to a carpet structure, and an application nozzle capable of discharging the foam into a coating pan for indirect application to the carpet structure.

Located within the enclosed pathway leading from means 10 for generating a foam to application outlet 14 is a conductivity sensor 15. Conductivity sensors are well-known in the prior art. Conductivity is defined as the ability of a substance to conduct electric current. Any sensor capable of measuring the conductivity of the foam is suitable for use in the present invention. Exemplary of a conductivity sensor suitable for use in the present invention is a contacting electrode conductivity sensor. Such a sensor operates by having two electrodes spaced from one another with the material to be tested located in the space between the electrodes. A charge is generated in one electrode, the amount of charge passing through the material to be tested to the second electrode gives a relative measure of conductivity.

In one preferred embodiment of the present invention, the conductivity sensor is an electrodeless conductivity sensor. Electrodeless conductivity sensors are well-known in the prior art. Generally, electrodeless conductivity sensors measure an induced current in a loop of solution. The electrodeless conductivity sensors contain 2 toroidally wound coils encapsulated in close proximity within the conductivity sensor. The sensor is immersed in the material which is to have its conductivity measured. An alernating current electrical signal is applied to one toroidal coil. Thereby, a current is generated in the material for which the conductivity measurement is sought. The current induced in the material for which the conductivity measurement is sought is directly proportional to the conductance of the material. This current induces a current in the second toroid. The strength of the current induced in the second toroid is directly proportional to the strength of the current induced in the material for which the conductivity measurement is sought.

Electrodeless conductivity sensors are preferred because they avoid some problems associated with contacting electrode conductivity sensors. Contacting electrode conductivity sensors can give inaccurate readings due to polarization of the electrodes. Electrodeless conductivity sensors avoid the problem of polarization.

Applicants have discovered that the conductivity of foams suitable for use in binding loops of yarn to a primary backing varies in a generally linear relationship with the density of said foams. This relationship is generally linear within the density ranges and temperature ranges desirable for application of suitable foams to carpet structures. When a styrene/butadiene copolymer latex is employed as the material to be foamed, the conductivity of foam formed varies in a generally linear relationship with density within the density range of from about 20 to about 95 volume percent gas incorporation based on total foam volume.

The signal from conductivity sensor 15 travels through lead 16 into translation means 17. Tranlation means 17 may translate the signal received from conductivity sensor 15 into a number of different readings. For example, translation means 17 can convert the signal into an output reading of conductivity. Based on the output reading of conductivity the foam density can be altered to achieve a desired degree of conductivity. Alternatively, the signal received by translation means 17 can be displayed directly as an output of voltage or current.

In one preferred embodiment of the present invention, based on the signal received from conductivity sensor 15, translation means 17 generates a signal which travels along lead 18 to gas volume control means 19. Based on the signal received from translation means 17 gas volume control means 19 either increases the amount of gas flowing to means 10 thereby lowering the density of the foam or decreases the volume of gas flowing to means 10 thereby increasing the density of the foam.

Since the conductivity of the foam varies with the density of the foam, the change in the density of the foam causes a change in the signal received by translation means 17 from conductivity sensor 15. Translation means 17 continues to alter the volume of gas supplied through gas volume control means 19 until receiving the desired signal from conductivity sensor 15. It is understood that control of gas volume control means 19 can be done electronically through translation means 17 or if translation means 17 simply outputs a conductivity reading or an output voltage or current, gas volume control means 19 may be adjusted manually to achieve a desired conductivity reading or output voltage or current reading which is effected by the lowering or raising of the density through the increase or reduction of the volume of gas contained in the foam.

Those skilled in the art will recognize a wide variety of means suitable for use as gas volume control means 19. Exemplary of such means are valves, and research control valves.

In another aspect, the invention concerns a method for controlling the density of a foam. The method comprises measuring the conductivity of the foam. The conductivity of the foam is then adjusted by altering the density of the foam until achieving the desired conductivity thereby achieving the desired foam density. Practice of the method of the present invention requires the use of foams the conductivity of which varies with the density of the foam. By determining the conductivity of the foam when said foam possesses the most desirable density one is able, through the practice of the present invention, to control the density of the foam simply and predictably. It is a matter of simple experimentation to determine the most desirable density for the foam and to determine the conductivity thereof. Once these values are determined it is simple, through the practice of the present invention, to directly or indirectly, manually or electronically, control the density of the foam. Moreover, if it is desirable to quickly change the desired foam density it is easy to change the targeted desirable conductivity for the foam to the level of conductivity predetermined to be possessed by a foam having the desired density.

The present invention is illustrated in further detail by the following example. The example is meant to be illustrative only and is not meant to limit in any manner, the scope of the invention as set forth in the following claims. All parts and percentages are based on weight unless specifically noted.

EXAMPLE

In the following example, the material to be foamed is formed by blending a latex of a copolymer of styrene and butadiene (60/40), a calcium carbonate filler, surfactants, and thickeners. The latex of a copolymer of styrene and butadiene has a solids content of 52 weight percent based on total latex weight. The latex is blended with the calcium carbonate filler, surfactants, and thickeners to produce the material to be foamed which has a solids content of 82 weight percent based on total weight of material to be foamed.

The material to be foamed is foamed in a Texicote foam machine. The material to be foamed has varying amounts of air incorporated therein. The exact amount of air incorporated in the material to be foamed is set forth in Table I.

The foamed material exits the foam head of the Texicote foam machine and passes through an enclosed pathway. Present in the enclosed pathway is an electrodeless conductivity sensor manufactured by Foxboro® and sold under the trade designation Foxboro®1210 Electrodeless Conductivity Sensor. The electrodeless conductivity sensor outputs a signal to a control device commercially available from Taylor under the trade designation Taylor Controller. The elecrodeless conductivity sensor outputs a signal related to the conductivity of the foam in the enclosed pathway. The conductivity of the foam is measured in millisiemens. Based on the signal received from the electrodeless conductivity sensor the control device outputs a signal to a control valve which controls the amount of air provided to the foam head. The amount of air provided to the foam head is adjusted until the desired conductivity signal is output by the electrodeless conductivity sensor. This results in a foam having a desirable density which density is controlled within a narrow range of deviation.

After passing past the electrodeless conductivity sensor, the foam passes through the remaining enclosed pathway and is applied to a carpet structure.

The amount of air incorporated in the foam, is varied and the density of the foam and conductivity of the foam is determined. The results appear in Table I.

TABLE I

| Run No. | Percent Air | Density[2] | Conductivity in Millisiemens |
|---|---|---|---|
| 1 | 0 | 55 | * |
| 2 | 33 | 37 | 4.3 |
| 3 | 51 | 26.9 | 3.67 |

TABLE I-continued

| Run No. | Percent Air | Density[2] | Conductivity in Millisiemens |
|---|---|---|---|
| 4 | 60 | 21.9 | 3.3 |

*Not Measured

[1]$100 - \left[ \dfrac{D_F}{D_{NF}} \times 100 \right]$

DF = Density of Foam, DNF = Density before Foaming
[2]In grams per fluid ounce.

Table I indicates that as the density and percent air vary so does the conductivity of the foam.

What is claimed is:

1. A method for controlling the density to a predetermined level of a foam during the preparation thereof wherein the electrical conductivity of the foam varies with the density thereof, the steps of the method comprising:
   (a) measuring the electrical conductivity of the foam during its preparation; and
   (b) adjusting the density of the foam in response to the measured electrical conductivity to produce an electrical conductivity corresponding to the desired density, thereby providing a foam with the desired predetermined density.

2. The method of claim 1 wherein the conductivity of the foam is determined by an electrodeless conductivity sensor.

3. The method of claim 1 wherein the foam is formed from a substance capable of binding loops of yarn to a primary backing material.

4. The method of claim 3 wherein the foam is formed from a latex comprising a copolymer of styrene and butadiene, said latex having a solids content of from about 45 to about 90 weight percent based on total latex weight.

5. The method of claim 4 wherein the copolymer of styrene and butadiene comprises from about 40 to about 75 weight percent styrene and from about 25 to about 60 weight percent butadiene, based on total styrene/butadiene copolymer weight.

6. A method for controlling the density to a predetermined level of a foam on a carpet structure during the preparation of the foam wherein the electrical conductivity of the foam varies with the density thereof, the steps of the method comprising:
   (a) measuring the electrical conductivity of the foam during its preparation and prior to deposition of the foam on the carpet structure; and
   (b) adjusting the density of the foam in response to the measured electrical conductivity to produce an electrical conductivity corresponding to the desired density, thereby providing a foam with the desired predetermined density.

7. The method of claim 6 wherein the conductivity of the foam is determined by an electrodeless conductivity sensor.

8. The method of claim 6 wherein the foam is formed from a natural or synthetic latex.

9. The method of claim 6 wherein the foam is formed from a latex comprising a copolymer of styrene and butadiene, said latex having a solids content of from about 45 to about 90 weight percent based on total latex weight.

10. The method of claim 9 wherein the copolymer of styrene and butadiene comprises from about 40 to about 75 weight percent styrene and from about 25 to about 60 weight butadiene, based on total styrene/butadiene copolymer weight.

11. An apparatus for controlling the density of a foam wherein the electrical conductivity of the foam varies with the density thereof, the apparatus comprising:
   (a) means for generating a foam;
   (b) an application outlet;
   (c) an enclosed pathway connecting the means for generating a foam and the application outlet, said enclosed pathway being suitable for conveying the foam from the means for generating a foam to the application outlet;
   (d) an electrical conductivity sensor located in the enclosed pathway, said electrical conductivity sensor being capable of measuring the electrical conductivity of the foam in the enclosed pathway; and
   (e) means for altering the density of the foam in response to the measured electrical conductivity to produce a foam having a desired density.

12. The apparatus of claim 11 wherein the electrical conductivity sensor located in the enclosed pathway is an electrodeless conductivity sensor.

13. The apparatus of claim 11 wherein the means for generating a foam is capable of forming a foam capable of binding loops of yarn to a primary backing material.

14. The apparatus of claim 13 wherein the means for generating a foam is capable of forming a foam from a latex comprising a copolymer of styrene and butadiene, said latex having a solids content of from about 45 to about 90 weight percent based on total latex weight.

15. The apparatus of claim 14 wherein the copolymer of styrene and butadiene comprises from about 40 to about 75 weight percent styrene and about 25 to about 60 weight percent butadiene based on total weight of styrene/butadiene copolymer.

16. The apparatus of claim 11 wherein the conductivity of the foam varies in a generally linear relationship with the density of the foam.

17. An apparatus for controlling the density of a foam on a carpet structure wherein the electrical conductivity of the foam varies with the density thereof, the apparatus comprising:
   (a) means for generating a foam;
   (b) an application outlet suitable for applying the foam to the carpet structure;
   (c) an enclosed pathway connecting the means for generating a foam and the application outlet, said enclosed pathway being suitable for conveying the foam from the means for generating a foam to the application outlet;
   (d) an electrical conductivity sensor located in the enclosed pathway, said electrical conductivity sensor being capable of measuring the electrical conductivity of the foam in the enclosed pathway; and
   (e) means for altering the density of the foam in response to the measured electrical conductivity to produce a foam having a desired density.

18. The apparatus of claim 17 wherein the foam conductivity sensor located in the enclosed pathway is an electrodeless conductivity sensor.

19. The apparatus of claim 17 wherein the means for generating a foam is capable of forming a foam from a natural or synthetic latex.

20. The apparatus of claim 19 wherein the means for generating a foam is capable of forming a foam from a latex comprising a copolymer of styrene and butadiene, said latex having a solids content of from about 45 to about 90 weight percent based on total latex weight.

21. The apparatus of claim 20 wherein the copolymer of styrene and butadiene comprises from about 40 to about 75 weight percent styrene and about 25 to about 60 weight percent butadiene, based on total styrene/butadiene copolymer weight.

22. The apparatus of claim 17 wherein the conductivity of the foam varies in a generally linear relationship with the density of the foam.

* * * * *